United States Patent
Huibers (10) Patent No.: US 7,434,946 B2
(45) Date of Patent: Oct. 14, 2008

(54) ILLUMINATION SYSTEM WITH INTEGRATED HEAT DISSIPATION DEVICE FOR USE IN DISPLAY SYSTEMS EMPLOYING SPATIAL LIGHT MODULATORS

(75) Inventor: Andrew Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 217 days.

(21) Appl. No.: 11/156,123

(22) Filed: Jun. 17, 2005

(65) Prior Publication Data
US 2006/0285083 A1 Dec. 21, 2006

(51) Int. Cl.
*G03B 21/20* (2006.01)
*G03B 21/18* (2006.01)
*G03B 21/26* (2006.01)
*G03B 21/28* (2006.01)
*H04N 9/12* (2006.01)
*H04N 5/74* (2006.01)
*G02F 1/1335* (2006.01)
*F21V 29/00* (2006.01)
*F21V 7/20* (2006.01)
*G02B 6/32* (2006.01)

(52) U.S. Cl. .................. 353/102; 353/37; 353/56; 353/84; 353/99; 348/743; 348/748; 348/759; 349/5; 362/264; 362/294; 362/345; 362/373; 362/560; 362/580; 385/34; 385/133

(58) Field of Classification Search .................. 353/84, 353/20, 30, 31, 37, 52, 56, 98, 99, 119, 122, 353/102; 348/742, 743, 744, 748, 759, 771; 349/5–9, 161; 362/257, 264, 294, 317, 341, 362/373, 345, 551, 560, 561, 600, 615, 623, 362/624, 580; 358/15, 34, 133
See application file for complete search history.

(56) References Cited

U.S. PATENT DOCUMENTS

| | | | |
|---|---|---|---|
| 3,913,872 A | 10/1975 | Weber | 362/554 |
| 5,303,084 A | 4/1994 | Pflibsen et al. | 359/503 |
| 5,592,188 A | 1/1997 | Doherty et al. | 345/84 |
| 5,835,256 A | 11/1998 | Huibers | 359/291 |
| 5,978,051 A | 11/1999 | Gohman et al. | 348/766 |
| 6,005,722 A | 12/1999 | Butterworth et al. | 359/712 |
| 6,205,271 B1 | 3/2001 | Bowron et al. | 385/31 |
| 6,356,700 B1 | 3/2002 | Strobl | 385/147 |
| 6,388,661 B1 | 5/2002 | Richards | 345/204 |
| 6,398,368 B2 | 6/2002 | Chen | 353/98 |
| 6,419,365 B1 | 7/2002 | Potekev et al. | 353/98 |
| 6,986,591 B2 * | 1/2006 | Pate | 362/296 |
| 7,070,280 B2 * | 7/2006 | Edlinger et al. | 353/20 |
| 7,163,299 B2 * | 1/2007 | Lee | 353/99 |
| 7,169,252 B2 * | 1/2007 | Frei et al. | 156/314 |
| 2002/0122621 A1 | 9/2002 | Li | 359/497 |
| 2002/0122653 A1* | 9/2002 | Donaldson et al. | 385/138 |
| 2002/0135874 A1 | 9/2002 | Li | 385/31 |
| 2003/0053787 A1 | 3/2003 | Lee | 385/136 |

(Continued)

FOREIGN PATENT DOCUMENTS

EP 1 167 873 7/2001
WO WO 02-25329 9/2001

*Primary Examiner*—Rochelle-Ann Blackman
(74) *Attorney, Agent, or Firm*—Wade James Brady, III; Frederick J. Telecky, Jr.

(57) ABSTRACT

Disclosed herein is an illumination system for use in display systems employing spatial light modulators. The illumination system comprises a fastening mechanism for securing the bonding of the walls of the light integrator of the illumination system. A heat dissipation mechanism can be alternatively provided for reducing the temperature of the illumination system by dissipating the heat thereof.

29 Claims, 5 Drawing Sheets

U.S. PATENT DOCUMENTS

| | | | |
|---|---|---|---|
| 2003/0099108 A1 | 5/2003 | Slobodin | 362/293 |
| 2003/0218726 A1 | 11/2003 | Huibers | 353/84 |
| 2004/0046940 A1* | 3/2004 | Yanagisawa | 353/31 |
| 2004/0057027 A1* | 3/2004 | Tani | 353/102 |
| 2004/0095767 A1* | 5/2004 | Ohmae et al. | 362/293 |
| 2004/0155856 A1 | 8/2004 | Richards | 345/102 |
| 2004/0165855 A1* | 8/2004 | Lee et al. | 385/137 |
| 2005/0063082 A1 | 3/2005 | Davis | 359/889 |

* cited by examiner

ILLUMINATION SYSTEM WITH INTEGRATED HEAT DISSIPATION DEVICE FOR USE IN DISPLAY SYSTEMS EMPLOYING SPATIAL LIGHT MODULATORS

TECHNICAL FIELD OF THE INVENTION

The present invention is related in general to illumination systems for use in projection systems, and more particularly, to illumination systems having light integrator for use in projection systems employing spatial light modulators.

BACKGROUND OF THE INVENTION

In current display systems employing spatial light modulators, such as liquid-crystal-display (LCD), liquid-crystal-on-silicon (LCOS), and microelectromechanical system (MEMS)-based display systems (e.g. spatial light modulators of reflective deflectable micromirrors), illumination light incident onto the spatial light modulators and thus modulated is produced by a combination of light sources producing white light, light integrators, and color filters.

Thermal light sources, such as arc lamps, are prevailingly used as the light sources to produce white light for the systems because of their high brightness with compact sizes.

The white light is conducted to the downstream optical devices, such as color filter, condensing lens, and the spatial light modulator via light integrators. A light integrator is generally a hollow internally reflective rectangular device, and uses multiple reflections of the incident light within the tunnel thereof to obtain homogenization of a generally round or non-uniform light beam by converting it into a uniform rectangular pattern. The light intensity may be reduced due to multiple reflections, but the resulting pattern is homogenized and uniform in light intensity. The reflected light is transmitted through the exit aperture as a rectangular beam, which is imaged onto the spatial light modulator. Thus, the light pipe is used to improve uniformity and preferably also match the aspect ratio of the illumination light to that of the spatial light modulator.

A color image can be generated by using more than one spatial light modulator, typically one per color (e.g. red, green and blue), and combining their images optically. Alternatively, a color display may be generated by temporarily interleaving separate images in different colors, using a color filter wheel. As the color filter wheel rotates rapidly, the color of the projected image cycles rapidly between the desired colors, typically the additive primaries red, green, and blue. When the colors are varied rapidly enough, the human eye perceives the sequential color fields as a single full-color image.

The illumination intensity and the brightness of the thermal sources, however, are proportional to the fourth power of source temperature. The high brightness and illumination intensity, therefore, are accompanied with intensive heat. Such heat propagates into and thus heats the downstream optical devices, such as the light integrator and the color filter. The heated optical devices may reach temperatures beyond their respective tolerances, resulting performance distortion, and even device failure. For example, if an arc lamp is used as the light source, intensive heat is produced accompanying the intensive illumination intensity and high brightness. Such heat propagates into the tunnel of the light integrator and may melt the adhesive typically used to bond the reflective walls of the light integrator. The intensive heat may also destroy the optical coatings on the color filter, causing device failure of the color filter.

Therefore, a method and device that efficiently dissipate produced heat from the light source and secure the thermal stability of optical devices without compromising image quality or the integrity of the system are desired.

SUMMARY OF THE INVENTION

The present invention discloses an illumination system for use in projection systems employing spatial light modulators with the illumination system comprising integrated mechanisms for limiting the temperature of the components of the illumination system within a safe range, and diminishing the propagation of the heat from the light source by providing one or more heat dissipation mechanisms.

As an example, a light integrator for use in a display system employing a spatial light modulator is disclosed. The system comprises: a plurality of walls each having a reflective surface, wherein the walls are bonded together to form a tunnel whose interior surfaces are the reflective surfaces; a fastening mechanism surrounding the bonded walls to secure the bonding; and wherein the fastening mechanism comprises a bonding agent that melts at one temperature and solidifies around room temperature.

In another example, an illumination system is disclosed. The system comprises: a source-pipe integrator that comprises: a thermal light source producing white light; and a light integrator that comprises a plurality of walls each having a reflective surface, wherein the walls are bonded together to form a tunnel whose interior surfaces are the reflective surfaces; a fastening mechanism surrounding the bonded walls to secure the bonding; and wherein the fasten mechanisms comprises a bonding agent that melts at one temperature and solidifies around room temperature; wherein the light integrator has an entrance aperture that is directly bonded to the exit aperture of the thermal light source.

In yet another example, a projection system comprises: an illumination system that comprises a source-pipe integrator that comprises: a thermal light source producing white light; and a light integrator that comprises a plurality of walls each having a reflective surface, wherein the walls are bonded together to form a tunnel whose interior surfaces are the reflective surfaces; a fastening mechanism surrounding the bonded walls to secure the bonding; and wherein the fasten mechanisms comprises a bonding agent that melts at one temperature and solidifies around room temperature; wherein the light integrator has an entrance aperture that is directly bonded to the exit aperture of the thermal light source; a spatial light modulating for modulating the illumination light beam; and a display target on which the modulated illumination light beam is projected.

In yet another example, a light integrator comprises: a plurality of walls each having a reflective surface bonded together forming a tunnel with a substantially rectangular cross section, wherein the walls are connected to each other at end surfaces thereof with a bonding agent that is a metal solder or glass frit.

In yet another example, a projection system comprises: a light source for providing a beam of light; a color wheel for providing light of different colors; a spatial light modulator upon which is incident the light of different colors; a projection optics for directing light onto a target; wherein the light pipe has four reflective walls bonded together with a substantially rectangular cross section, wherein the four walls are connected to each other at end surfaces thereof with a bonding agent that is a metal solder or glass frit.

Objects and advantages will be obvious and will, in part, appear hereinafter and will be accomplished by the present invention that provides a device and method for efficiently and reliably dissipate produced heat from the thermal light sources. Such objects of the invention are achieved in the features of the independent claims attached hereto. Preferred embodiments are characterized in the dependent claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The present invention discloses an illumination system for use in projection systems employing spatial light modulators with the illumination system comprising integrated mechanisms for limiting the temperature of the components of the illumination system within a safe range, and diminishing the propagation of the heat from the light source by providing one or more heat dissipation mechanisms.

Figure 1:
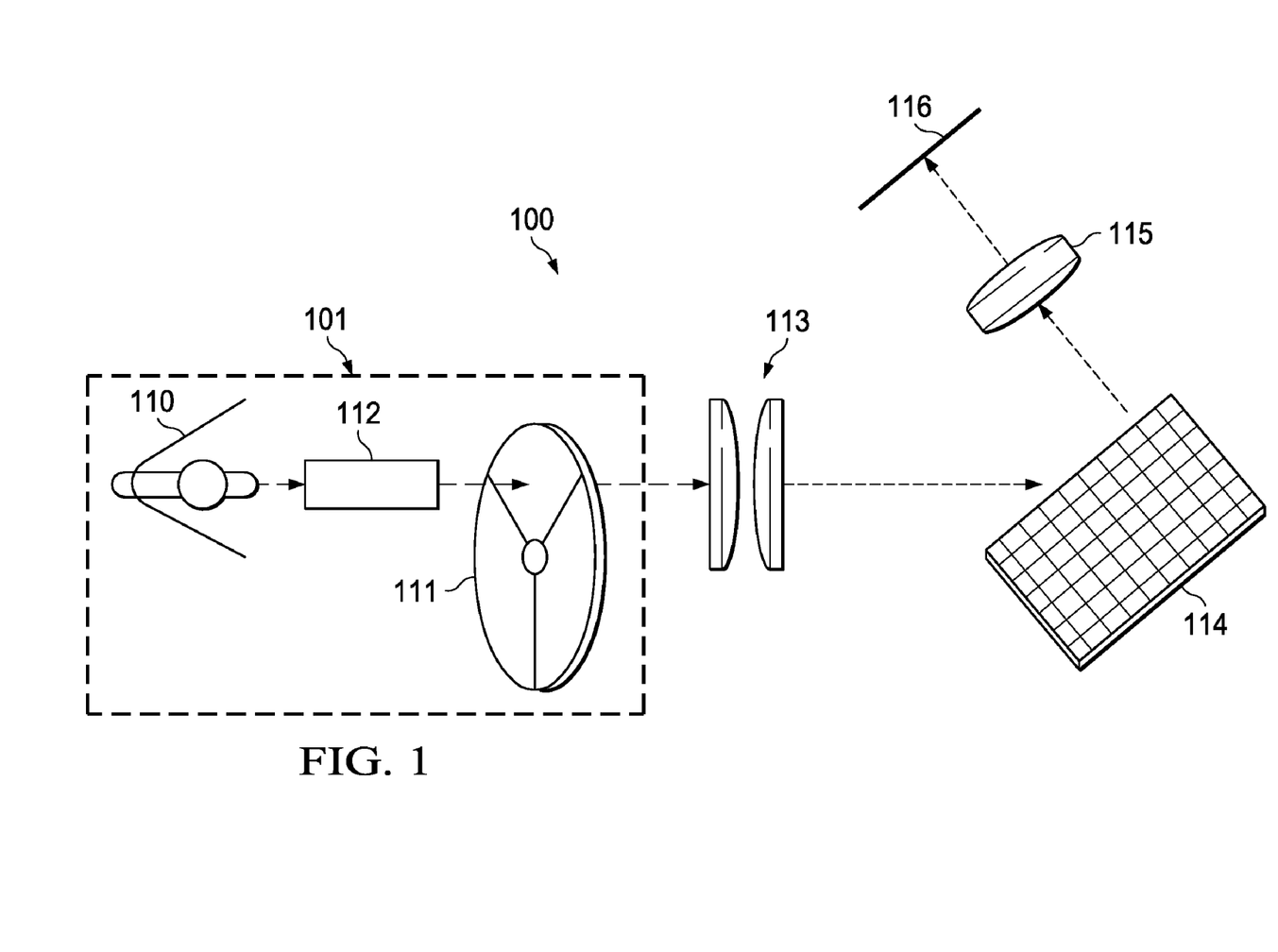
FIG. 1 illustrates an exemplary display system having an illumination system in which embodiments of the invention can be implemented.

Turning to the drawings, FIG. 1 presents an exemplary display system that employs a spatial light modulator. In its basic configuration, display system 100 comprises illumination system 101 for producing sequential colour light, spatial light modulator 114, projection lens 115, and display target 116. Other optics, such as condensing lens 113 could also be installed if desired. The spatial light modulator can be a liquid-crystal-display (LCD), liquid-crystal-on-silicon (LCOS), or a microelectro-mechanical system (MEMS)-based (e.g. micromirror-based) spatial light modulator.

Illumination system 101 comprises light source 110, which is a thermal light source such as an arc lamp, light integrator 112 that can be any suitable integrator of light or light beam shape changer, and colour filter 111, which can be a colour wheel.

Light integrator 112 is generally a hollow internally reflective rectangular device, and uses multiple reflections of the incident light within the tunnel thereof to obtain homogenization of a generally round or non-uniform light beam by converting it into a uniform rectangular pattern.

Figure 2:
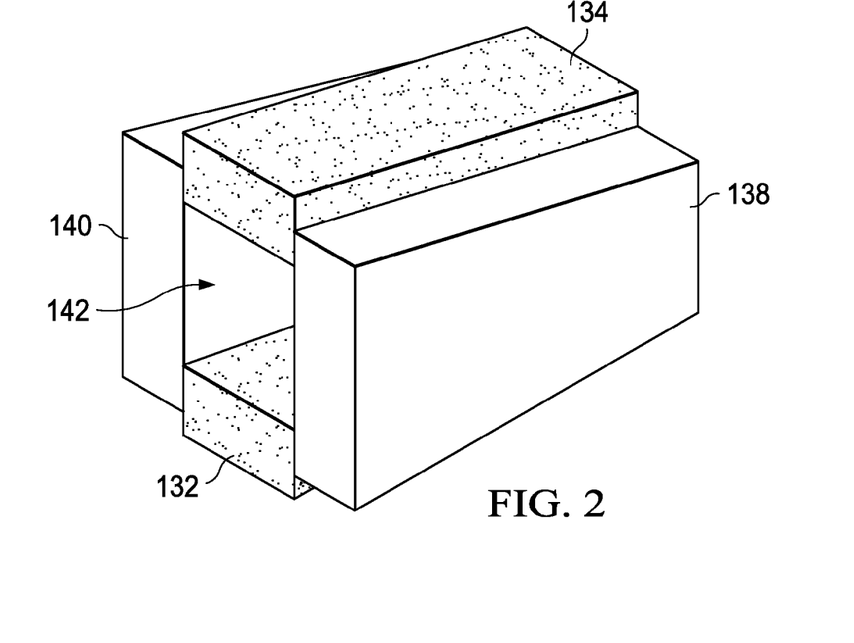
FIG. 2 illustrates a perspective view of an exemplary light integrator in the illumination system of FIG. 1.

An exemplary light integrator is illustrated in FIG. 2. Referring to FIG. 2, the light integrator comprises top wall 134, bottom wall 132, side walls 140 and 138. Each wall comprises an internal reflective surface for reflecting the light from the thermal light source. The walls are bonded with a bonding material. The internal reflective surfaces together form a tunnel having entrance aperture 142 and exit aperture 144. The entrance aperture faces the thermal light source and collects the light from the thermal source. Specifically, the light from the thermal light source enters into the tunnel of the light integrator from the entrance aperture and exits the tunnel from the exit aperture of the tunnel.

In operation, the light integrator is required to be optically aligned with other optical devices, such as the exit aperture of the thermal light source, the color filter, and the spatial light modulator. Such requirement raises a stringent constraint that the relative positions of the reflective surfaces need to be firmly fixed. Any erroneous relative displacement of the reflective surfaces would be amplified as the illumination light propagates. The erroneous relative displacement, however, can be also caused by thermal heating in addition to undesired mechanical movements or careless handling. Specifically, because the high brightness and illumination intensity of the light from the thermal light source is unavoidably accompanied with intensive heat that propagates with the illumination light, such intensive heat is unavoidably collected by the light integrator and raise the temperature of the light integrator. When the temperature of the light integrator reaches the melting temperature or beyond the tolerable temperature range, the adhesive used for bonding the walls of the light integrator may melt, resulting in severe relative displacements of the reflective surfaces of the light integrator. For this reason, a fastening mechanism is applied to the light integrator, an example of which is shown in FIG. 3.

Figure 3:
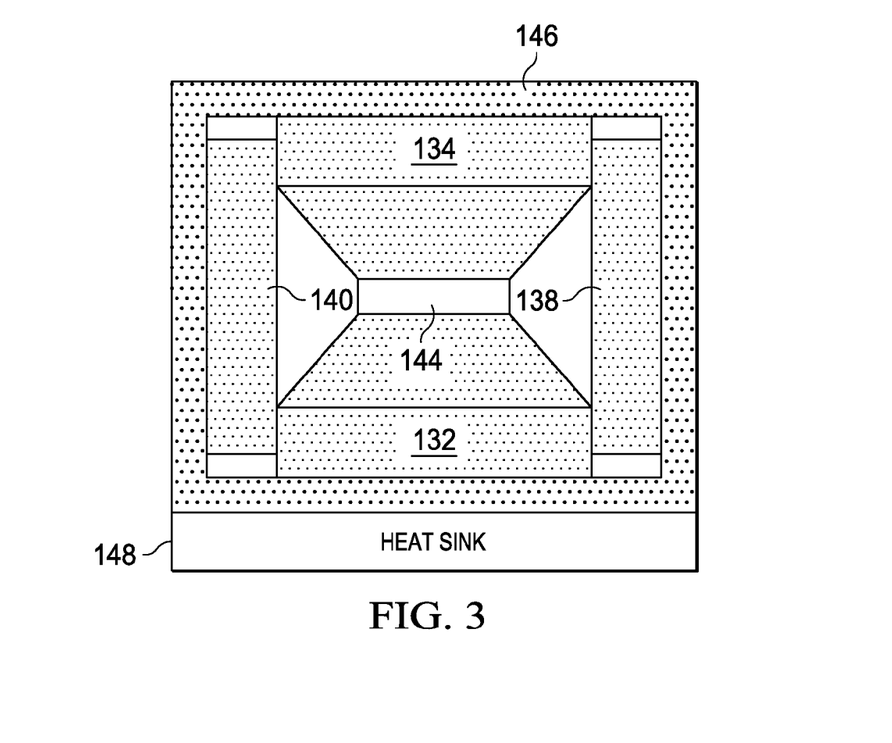
FIG. 3 illustrates the light integrator of FIG. 2 in which an embodiment of the invention is implemented.

Referring to FIG. 3, fastening mechanism 146 is attached to the walls of the light integrator and firmly holds the walls so as to secure the relative positions of the walls and the reflective surfaces. The fastening mechanism can be in the form of one or more clamps surrounding and holding the walls together. Alternatively, the fastening mechanism can be in the form of plates (e.g. rigid plastic or non-plastic plates) or sheets that are attached and fully cover the major external surfaces of the walls. The clamps or other mechanical holding mechanisms are also desired to be tightened with sufficient tension such that the walls of the light pipe are held together without gaps between walls and yet such that the pressure is not so high as to fracture the light pipe.

The fastening mechanism can be made of any suitable materials, more preferably of a material having a high melting temperature and small extendibility or large resilience. Examples of such materials are metal, metal alloy and ceramics. For reducing the temperature by dissipating the heat thereof, it is more preferred that the fastening mechanism composes a material of high thermal conductivity such that the heat of the walls can be conducted to the heat sink attached to the walls, such as heat sink 148. When a ceramic is used, it is preferred that such ceramic has a high thermal conductivity.

Even though only one heat sink is illustrated in the figure, more heat sinks can be provided, for example with each heat sink being attached on one side to the fastening mechanism.

As an alternative feature of the embodiment, the exterior surface of the fastening mechanism can be coated with a light absorbing or a light reflecting film so as to reduce undesired light scattering or undesired thermal heat from the light incident onto the exterior surfaces of the fastening mechanism.

Figure 4:
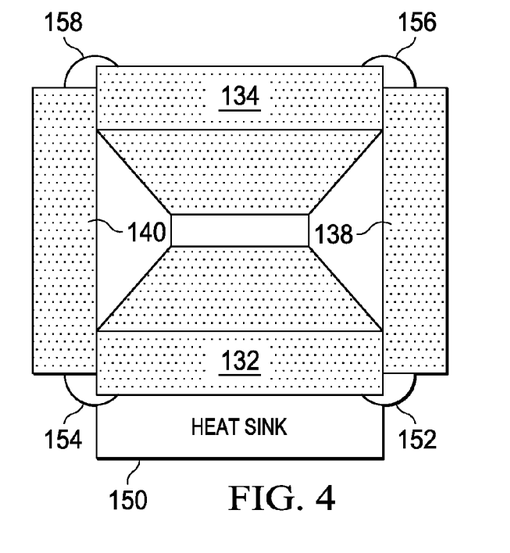
FIG. 4 illustrates the light integrator of FIG. 2 in which another embodiment of the invention is implemented.

Another approach to reduce the temperature by dissipating the heat of the light integrator is to use selected adhesive material, as demonstrated in FIG. 4. Referring to FIG. 4, in addition to the adhesive material used for bonding the walls (132, 134, 138, and 140) together, adhesive material 152, 154, 156, and 158 are respectively applied to the joints of the adjacent walls 138 and 132, 132 and 140, 138 and 134, and 134 and 140. The additional adhesive materials can be applied as strips each being disposed along the length of the joint and fully coving the joint. Alternatively, each additional adhesive material is disposed as segments partially covering the joints.

In lieu of typical adhesive bonding, one embodiment of the present invention utilizes other bonding methods, such as compression bonding, solder bonding, glass frit bonding or other bonding processes known in the art that have high thermal resistivity. The application of a metal solder (for soldering) or other seal (e.g. glass frit) or another method could be used (such as compression bonding with metals) to ensure that the seal has high thermal resistivity. If compressive bonding is used, the metal for compression bonding could be any suitable metal for this purpose with a high thermal conductivity, such as gold or indium. Preferably, the bonding agent used to connect the four walls of the light pipe together has a melting point of 150° C. or more, or 175° C. or more, or even 185° C. or more (or in some cases 200° C. or more). It is also preferred that the additional adhesive materials have a high critical temperature beyond which the adhesive material substantially changes its mechanical property (e.g. the resilience and/or the extendibility). Examples of such materials include epoxy and epoxy mixed with metallic materials such as beads of metallic, metal alloy or ceramic with high thermal conductivity. For dissipating the heat of the walls of the light integrator so as to reduce the temperature, one or more heat sinks, such as heat sink 150 is provided and attached to a wall of the light integrator.

Figure 5:
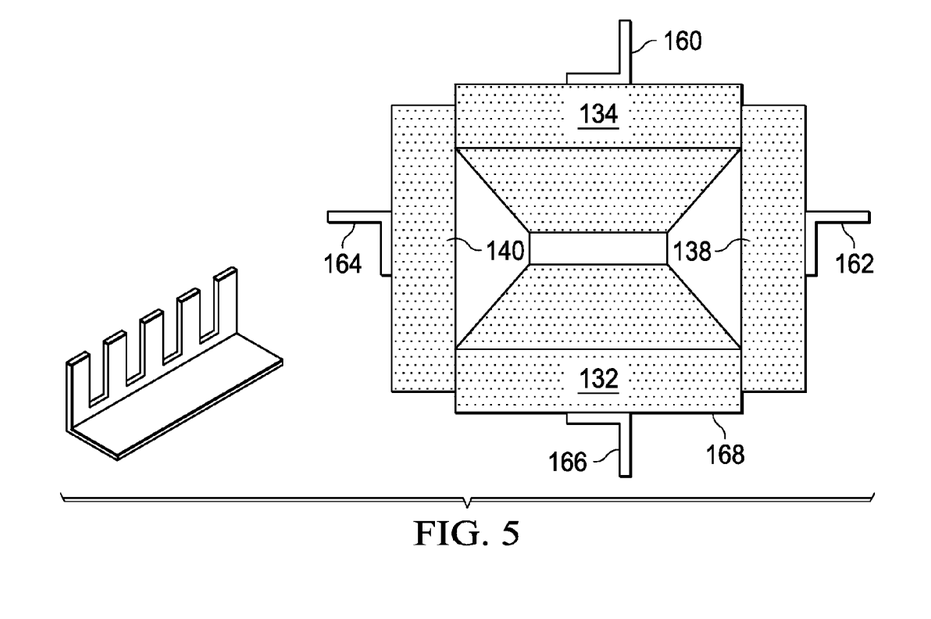
FIG. 5 illustrates the light integrator of FIG. 2 in which yet another embodiment of the invention is implemented.

In addition to the heat sink, such as heat sinks 148 in FIG. 3 and 150 in FIG. 4, heat fins, such as the heat fin schematically illustrated in the insert figure can be applied, with or without the heat sinks, as shown in FIG. 5. Referring to FIG. 5, heat fins 160 162, 164, and 166 are respectively attached to the walls 134, 138, 140, and 132 for dissipating the heat of the walls. The fins are preferably made of a material with high melting temperature and high thermal conductivity, such as metal, metal alloy, and selected ceramics. For examples, the fins can be made of aluminum alloy or other thermally conductive material. The heat fins can be attached and bonded to the walls with any suitable bonding method, such as bonding with a solder or a suitable adhesive material with high melting temperature and more preferably with high thermal conductivity.

Figure 6:
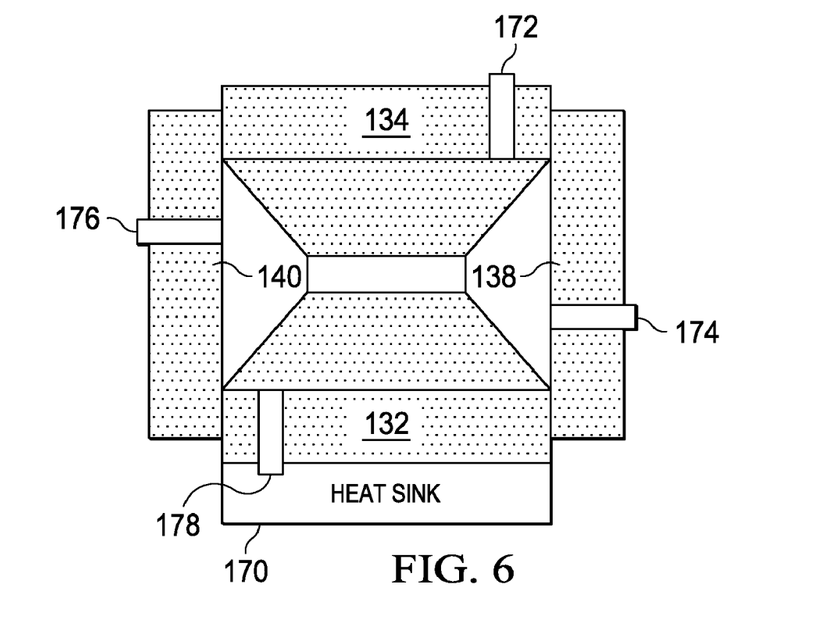
FIG. 6 illustrates the light integrator of FIG. 2 in which yet another embodiment of the invention is implemented.

For better dissipating the heat of the walls of the light integrator, heat dissipation ducts can be made in the components of the light integrator. For example, heat dissipation ducts 172, 174, 176, and 178 can be respectively made in the walls 134, 138, 140, and 132, as shown in FIG. 6. The heat dissipation ducts can be in the form of holes each of which has one end close to the interior surface of the wall but not penetrating through the reflective surface, and the other end opening to the environment. These dissipation ducts allow heat to escape to the exterior of the light integrator. By the same principle, the walls of the light integrator may be made thinner to allow heat to be conducted more quickly to the exterior of the light integrator. Or a material with high thermal conductivity, such as sapphire, may be used to form the walls of the light integrator, so that heat may be conducted to the exterior. Moreover, more heat dissipation ducts can be made for one single wall, and in which situation, the multiple dissipation ducts can be interconnected to expedite the heat dissipation process. In addition to the heat dissipation ducts, heat sink 170 can also be provided.

According to the invention, the above discussed features of the fastening mechanisms, such as the fastening mechanisms 146 in FIG. 3 and FIG. 4, and the heat dissipation mechanisms, such as the heat sinks 148 in FIG. 3, 150 in FIG. 4, 166 in FIG. 5, and 170 in FIG. 6, heat fins (e.g. 160, 162, 164, and 166 in FIG. 5), and heat dissipation ducts (e.g. 172, 174, 176, and 178 in FIG. 6) can be used individually or in any combination thereof. For example, one or more heat dissipation ducts similar to those in FIG. 6 can also be made in the fastening mechanisms, such as the fastening mechanism 146 in FIG. 3 (not shown in the figure), and the adhesive materials 158, 156, 152, and 154 in FIG. 4. Moreover, the light integrator may comprise a reflective surface that has a movable portion during operation to dynamically adjust the aspect ratio of the exit aperture, as set forth in U.S. provisional patent application Ser. No. 60/620,395 filed Oct. 19, 2004, the subject matter being incorporated herein by reference.

In operation the light integrator is required to be optically aligned to the other optical components, such as the light source, the light integrator and the light source can be integrated into a source-pipe integrator, in accordance with yet another embodiment of the invention. One example of such source-pipe integrator is illustrated in FIG. 7.

Figure 7:
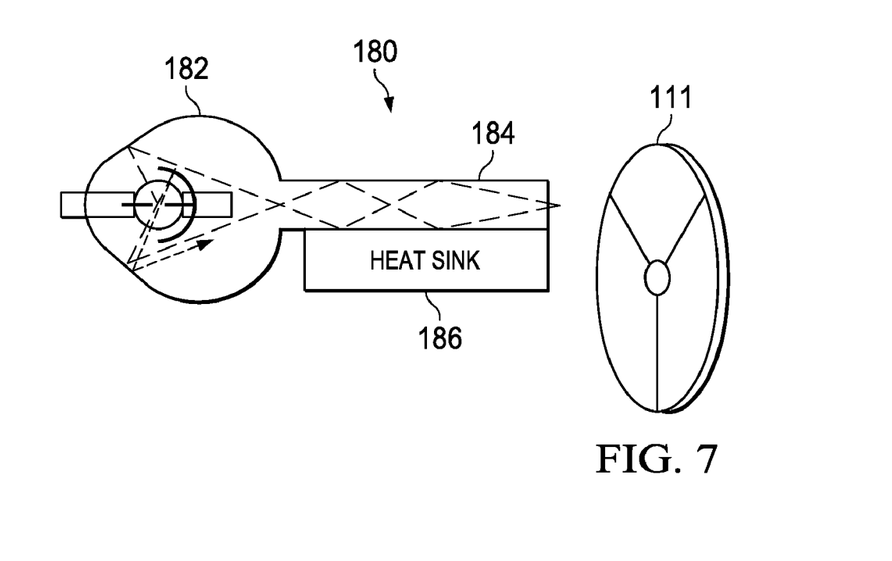
FIG. 7 illustrates an exemplary illumination system wherein the light integrator is integrated with the light source according to yet another embodiment of the invention.

Referring to FIG. 7, source-pipe integrator 180 comprises light source 182 and light integrator 184 whose entrance aperture is directly joint to the exit aperture of the light source. For example, the entrance aperture of the light integrator and the exit aperture of the light source can be joined together with soldering (e.g. metal soldering) and bonding with selected materials, such as glass frits and adhesive materials and other suitable methods. Other features, such as heat sink 186, heat fins, heat dissipation ducts, fastening mechanisms, and light blocking and/or absorbing films on the exterior major surfaces of the light integrator, can also be applied, which will not be discussed in detail herein. The above alternative features, however, can also be applied to the exterior surfaces of the light source as appropriate. Specifically, heat dissipation mechanisms, such as heat fins, heat sinks, and heat dissipation ducts can be used for the light source independent from the application of these features to the light integrator.

Because the light integrator is integrated with the thermal light source whose interior cavity is under low pressure, the interior tunnel of the light integrator is guaranteed to have the same pressure of the interior cavity of the light source. For this purpose, the exit aperture of the light integrator is covered with an exit cover window, such as glass, that is hermetically sealed to the exit aperture of the light integrator. The exit cover window can be coated with suitable optical films to increase the transmission of the light within the tunnel.

In fact, other feature can be applied to the exit cover window. For example, a mask or an aperture slit can be attached to the exit cover window so as to adjust the optical properties, such as the size, and solid angle of the illumination light escaped from the exit aperture of the sour-pipe integrator. When an aperture slit having dynamically adjustable slit size is applied, different optical properties of the illumination light to satisfy different optical requirements, such as requirements arising from different aspect ratios, may be achieved.

Figure 8:
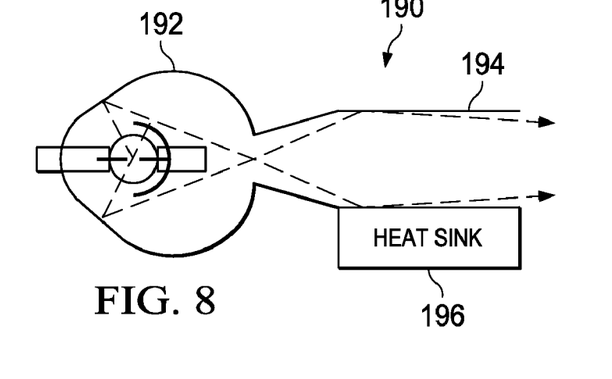
FIG. 8 illustrates an exemplary illumination system wherein the light integrator is integrated with the light source according to yet another embodiment of the invention.

Integrated with a light source can also be different light integrators, such a light integrator with tapered reflective surfaces, one of which is illustrated in FIG. 8. Referring to FIG. 8, light integrator 194 is integrated with thermal source 192 in the same way as the light integrator 184 to thermal light source 182 in FIG. 7. The light integrator, however, has a front portion with tapered reflective surfaces joined to the exit aperture of the thermal light source.

Figure 9:
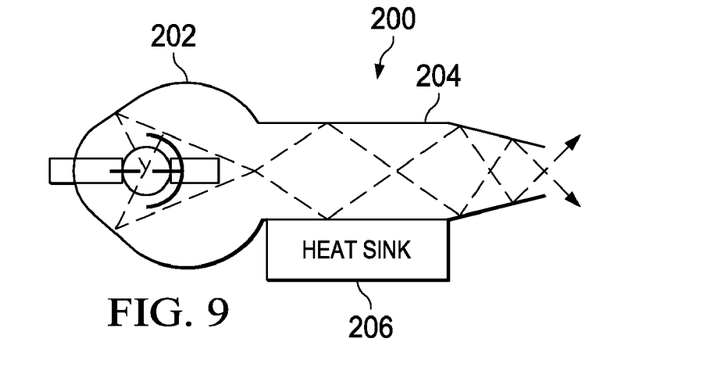
FIG. 9 illustrates an exemplary illumination system wherein the light integrator is integrated with the light source according to yet another embodiment of the invention.

Alternative to the front portion having tapered reflective surfaces, the rear portion close to the exit aperture of the light integrator may have tapered reflective surfaces as shown in FIG. 9.

Figure 10:
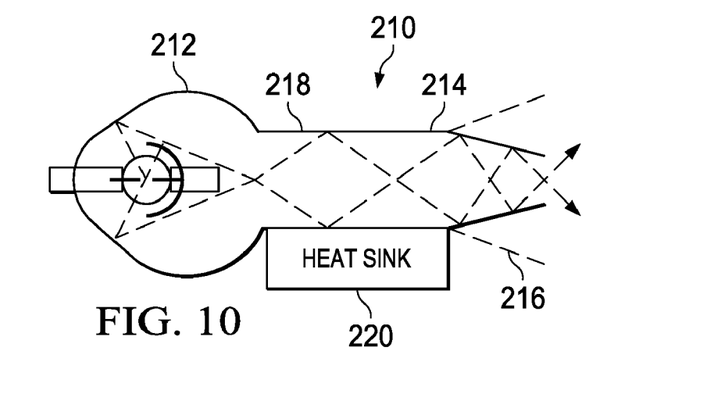
FIG. 10 illustrates an exemplary illumination system wherein the light integrator is integrated with the light source according to yet another embodiment of the invention.

As another alternative configuration, the light integrator of the source-pipe integrator may comprise a light integrator with movable reflective surfaces, as set forth in U.S. provisional patent application Ser. No. 60/620,395 filed Oct. 19, 2004, the subject matter being incorporated herein by reference. As a way of example, light integrator 214 comprises non-movable portion 218 and movable portion 216. The non-movable portion has one end directly joined to the exit aperture of light source 212 and the other end smoothly joined to the entrance of the movable portion 216. In operation, the movable portion has at least two positions that are not parallel. Specifically, switching of the movable reflective surface requires at least a rotation of the reflective surface from one position towards the other.

In the source-pipe integrators as discussed above, the thermal light source can be other type of thermal light sources, such as the thermal light source with spiral reflectors, as set forth in U.S. provisional patent applications Ser. No. 60/612,096 filed Sep. 21, 2004, and Ser. No. 60/643,237 filed Feb. 9, 2004, the subject matter of each being incorporated herein by reference.

The fastening mechanisms (e.g. the fastening mechanism as discussed with reference to FIGS. 3 and 4), heat dissipation mechanisms (e.g. the heat sink and heat dissipation ducts as discussed with reference to FIGS. 3 to 6), and the light absorbing/blocking films can be applied to either one or both of the light integrator and the thermal light source of the source-pipe integrators in FIGS. 7 to 10, either individually or in any combination thereof. For example, heat sinks 196 in FIG. 8, 206 in FIG. 9, 220 in FIG. 10 can be respectively attached to the light integrators 194, 204, and 214.

It will be appreciated by those skilled in the art that a new method and apparatus for use in illumination systems of display systems employing spatial light modulators so as to limit the temperature of the components of the illumination system within a safe range, and diminish the propagation of the heat from the light source have been describe herein. In view of the many possible embodiments to which the principles of this invention may be applied, however, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the following claims, only elements denoted by the words "means for" are intended to be interpreted as a means plus function claims under 35 U.S.C. §112, paragraph 6.

I claim:

1. A light integrator for use in a display system employing a spatial light modulator, comprising:
    a plurality of walls each having a reflective surface, wherein the walls are bonded together to form a tunnel whose interior surfaces are the reflective surfaces;
    a fastening mechanism comprising a bonding agent that bonds the plurality of walls together and has a melting temperature 150° C. or higher, wherein the bonding agent is a metal solder or a glass frit; and
    a heat dissipation mechanism directly attached to or integrated in at least one of the plurality of walls of the light integrator for reducing the temperature of the walls by dissipating the heat thereof.

2. The light integrator of claim 1, wherein the fastening mechanism comprises a clamp.

3. The light integrator of claim 1, wherein the bonding agent has a melting temperature that is 200° C. or higher.

4. The light integrator of claim 3, wherein the bonding agent has a melting temperature that is 250° C. or higher.

5. The light integrator of claim 1, wherein the heat dissipation mechanism comprises a heat sink attached to the light integrator.

6. The light integrator of claim 1, wherein the heat dissipation mechanism comprises a heat fin attached to one of the walls.

7. The light integrator of claim 1, wherein the heat dissipation mechanism comprises a heat dissipation duct in one of the walls.

8. The light integrator of claim 1, wherein the heat dissipation duct is a hole whose one end is disposed close to the reflective surface of one of the walls but not penetrating through the reflective surface and the other end is opened.

9. The light integrator of claim 1, wherein the walls further comprise a light blocking film on a major exterior surface thereof.

10. The light integrator of claim 1, wherein one of the reflective surfaces comprises a movable portion having at least two non-parallel operation positions.

11. An illumination system comprising a source-pipe integrator that comprises:
    a thermal light source producing white light; and
    a light integrator of claim 1, wherein the light integrator has an entrance aperture that is directly bonded to the exit aperture of the thermal light source.

12. The illumination system of claim 11, wherein the thermal light source is an arc lamp.

13. The illumination system of claim 11, further comprising: a color filter having a set of primary color segments.

14. The illumination system of claim 13, wherein the light integrator has an exit aperture facing a segment of the color filter.

15. A projection system, comprising:
    an illumination system of claim 11 producing an illumination light beam;
    a spatial light modulator for modulating the illumination light beam; and
    a display target on which the modulated illumination light beam is projected.

16. The projection system of claim 15, wherein the spatial light modulator is a liquid crystal.

17. The projection system of claim 15, wherein the spatial light modulator is a liquid crystal on silicon.

18. The projection system of claim 15, wherein the spatial light modulator comprises an array of reflective deflectable micromirrors.

19. A light integrator comprising:
    a plurality of walls each having a reflective surface bonded together forming a tunnel with a substantially rectangular cross section, wherein the walls are connected to each other at end surfaces thereof with a bonding agent that is a metal solder or glass fit; and
    a heat dissipation mechanism directly attached to or integrated in at least one of the plurality of walls of the light integrator for reducing the temperature of the walls by dissipating the heat thereof.

20. The light integrator of claim 19, further comprising: a fastening mechanism that comprises a clamp.

21. The light integrator of claim 19, wherein the bonding agent has a melting temperature that is 150° C. or higher.

22. The light integrator of claim 19, wherein the bonding agent has a melting temperature that is 200° C. or higher.

23. The light integrator of claim 19, wherein the heat dissipation mechanism comprises a heat sink attached to the light integrator.

24. The light integrator of claim 19, wherein the heat dissipation mechanism comprises a heat fin attached to one of the walls.

25. The light integrator of claim 19, wherein the heat dissipation mechanism comprises a heat dissipation duct in one of the walls.

26. The light integrator of claim 25, wherein the heat dissipation duct is a hole whose one end is disposed close to the reflective surface of one of the walls but not penetrating through the reflective surface and the other end is opened.

27. The light integrator of claim 19, wherein the walls further comprise a light blocking film on a major exterior surface thereof.

28. A projection system comprising:
a light source for providing a beam of light;
a light pipe capable of changing a cross-section of the beam of light;
a color wheel for providing light of different colors;
a spatial light modulator upon which is incident the light of different colors; and
projection optics for directing light onto a target,
wherein the light pipe has four reflective walls bonded together with a substantially rectangular cross section, wherein the four walls are connected to each other at end surfaces thereof with a bonding agent that is a metal solder or glass frit, and wherein the light pipe has a heat dissipation mechanism directly attached to or integrated in at least one of the walls for reducing the temperature of the walls by dissipating the heat thereof.

29. The system of claim 28, wherein the color wheel is positioned between the light pipe and the spatial light modulator.

* * * * *